United States Patent [19]  
Kaneko

[11] Patent Number: 5,051,679  
[45] Date of Patent: Sep. 24, 1991

[54] STEP MOTOR CONTROL DEVICE
[75] Inventor: Naohisa Kaneko, Toyokawa, Japan
[73] Assignee: Brother Kogyo Kabushiki Kaisha, Japan
[21] Appl. No.: 499,804
[22] Filed: Mar. 27, 1990
[30] Foreign Application Priority Data Mar. 30, 1989 [JP] Japan .................................. 1-78962

[51] Int. Cl.⁵ .............................................. H02P 8/00
[52] U.S. Cl. ..................................... 318/696; 318/685
[58] Field of Search ................................. 318/696, 685
[56] References Cited
U.S. PATENT DOCUMENTS

4,641,073 2/1987 Sawada ........................... 318/685 X
4,701,687 10/1987 Yoshimoto ........................... 318/696

Primary Examiner—William M. Shoop, Jr.
Assistant Examiner—Saul M. Bergmann
Attorney, Agent, or Firm—Kane, Dalsimer, Sullivan, Kurucz, Levy, Eisele and Richard

[57] ABSTRACT

A step motor control device for controlling a performance of a step motor by outputting a plurality of phase of pulses, having a keyboard for inputting a number of steps for the performance of the step motor, is capable of determining an interval of time for outputting the pulses according to the number of steps inputted through the keyboard, and outputting the pulses in response with the interval determined by the determining means.

9 Claims, 5 Drawing Sheets

STEP MOTOR CONTROL DEVICE

BACKGROUND OF THE INVENTION

The present invention relates to a step motor control device for controlling a step motor to drive sufficiently, more particularly, to a step motor control device for controlling intervals between each pulse to be applied to a step motor.

Conventionally, a typical step motor control device has been provided with a pulse table for storing therein a time interval between each pulse to be applied to a step motor besides a work memory STEP1 (simplified as STEP1 hereinafter) for counting remaining steps to be performed by the step motor and another work memory STEP2 (simplified as STEP2 hereinafter) for counting steps from the beginning of the perfomance of the step motor.

Table 1 shows an example of the pulse table. DATANO indicates the order of data in the table. Table size (simplified as TBSIZE hereinafter), which informs the number of the data in the table, is ten in this case.

TABLE 1

| DATANO | 0 | 1 | 2 | 3 | 4 | 5 | 6 | 7 | 8 | 9 |
|---|---|---|---|---|---|---|---|---|---|---|
| PULSE TIME (msec.) | 4.0 | 3.0 | 3.4 | 3.1 | 2.7 | 3.1 | 3.4 | 3.9 | 4.0 | 30.0 |

For the convenience, the pulse time corresponding to the DATANO will be transcribed as PULSTB-(DATANO) hereinafter. For instance, the pulse time when DATANO=3 is 3.1 (msec.), which is transcribed as PULSTB(3)=3.1 (msec.). According to Table 1, when the accelerated performance of the step motor is required, pulse time data corresponding to DATANO of 0 through 3 are sequentially read out of the pulse table and pulses are applied to the step motor in accordance with the read-out pulse time data. When constant performance is required, pulse is applied to the step motor corresponding to PULSTB(4). When decelerated performance is required, pulse is applied to the step motor in accordance with the pulse time PULSTB(5) through PULSTB(9) which are sequentially read out of the pulse table in this order.

Figure 1:
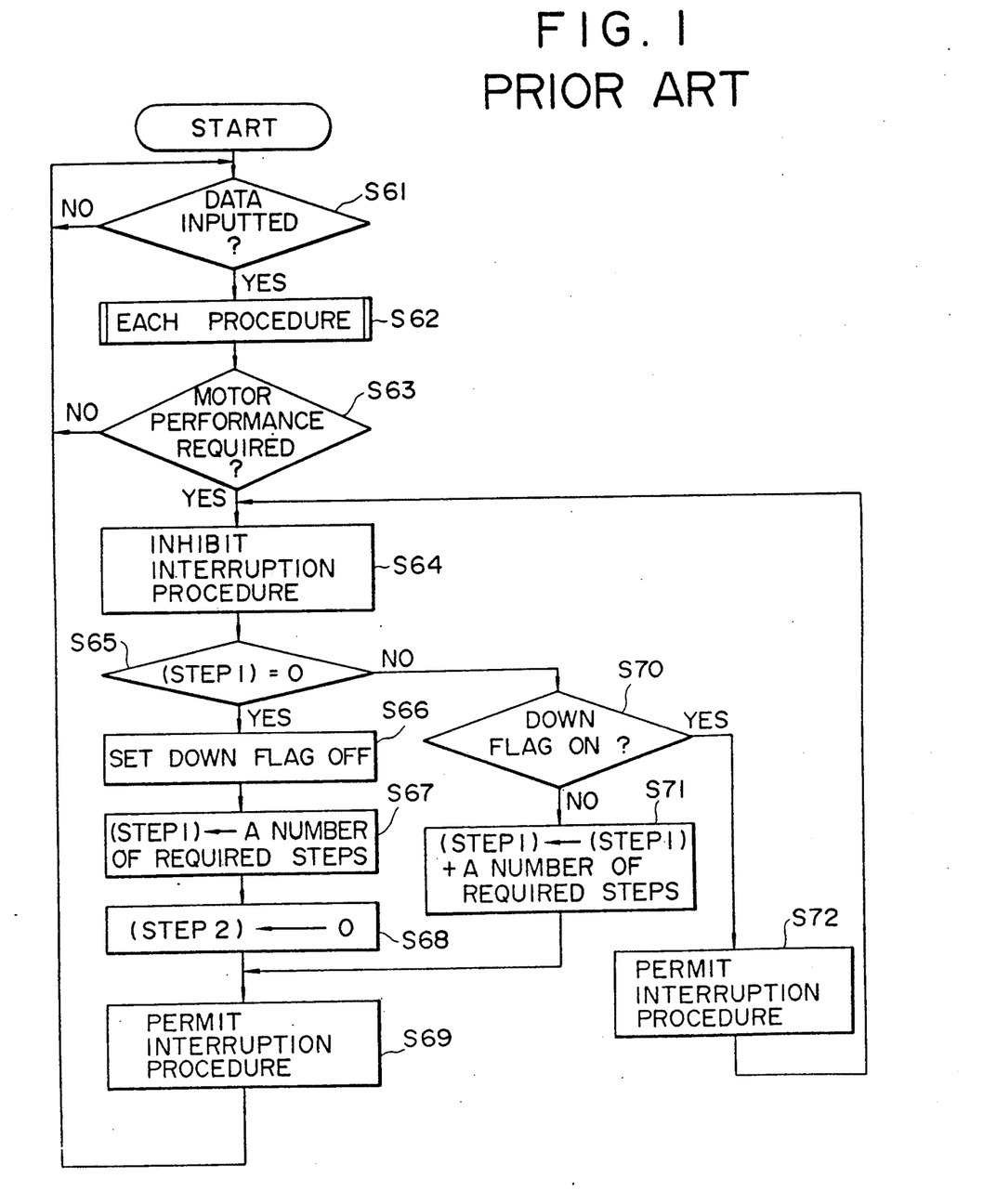
FIG. 1 is a flowchart illustrating a main control routine of the conventional motor control device.
Figure 2:
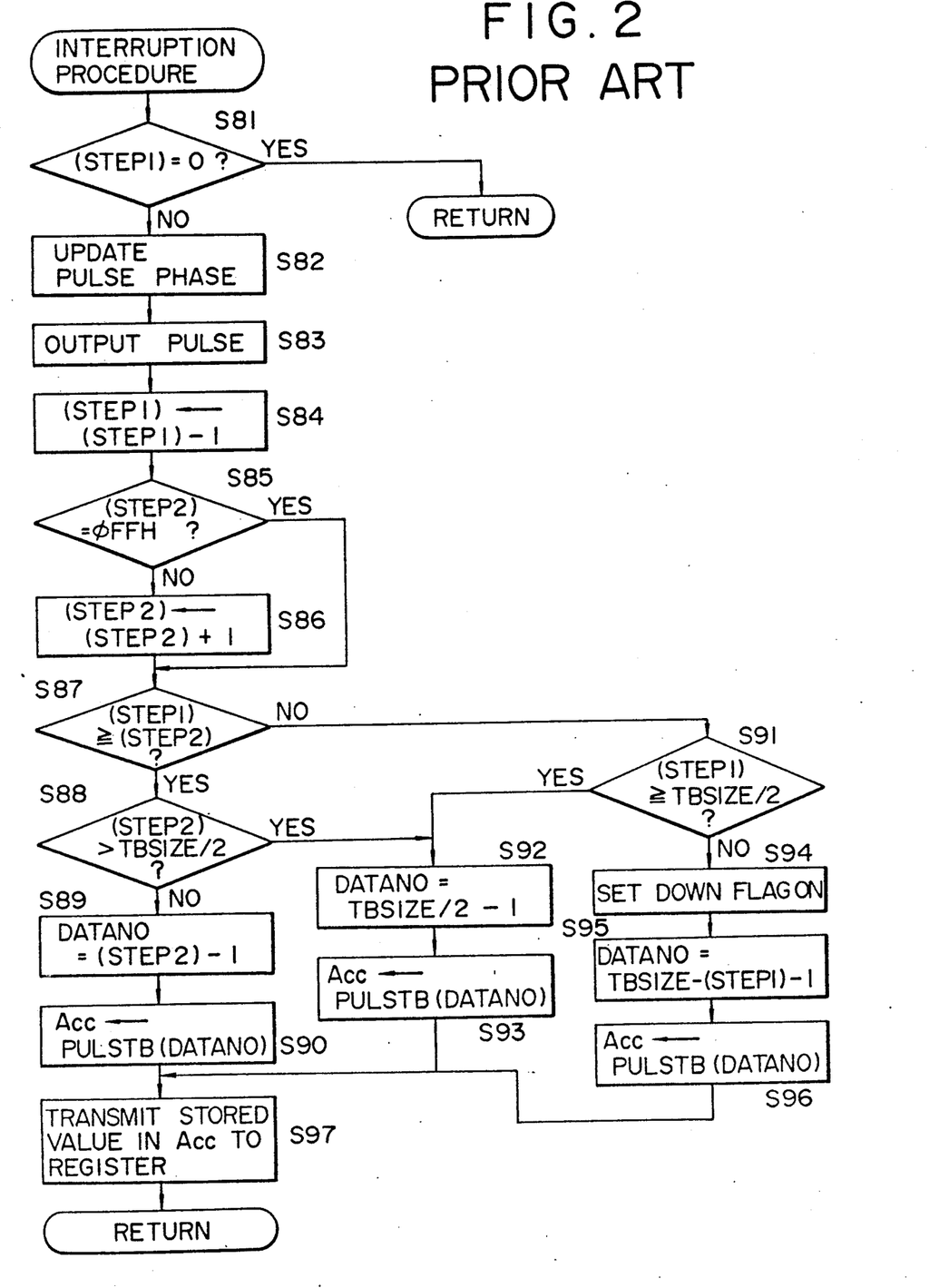
FIG. 2 is a flowchart illustrating a conventional interruption procedure for driving the step motor.

FIG. 1 is a flowchart illustrating a main control routine of the conventional motor control device, and FIG. 2 is a flowchart illustrating an interruption procedure for driving the step motor.

First, data is inputted at step S61. In step S62, the procedure according to the inputted data is executed. If the inputted data requires motor performance (YES in step S63), the procedure goes to step S64. Note that, the requirements of the motor performance is generated when steps for a single or an additional performance are inputted. If NO in step S64, the procedure returns to step S61. At step S64, the interruption procedure of the step motor is inhibited and parameters for the control routine are set in steps S65 through S68 of FIG. 1. When the procedure goes to step S69, an interruption procedure for the performance of the step motor is permitted. The interruption procedure of the step motor is illustrated in a flowchart of FIG. 2. In this procedure, a phase of the pulse is updated at step S83 and the pulse is outputted to the step motor in step S84. The parameters are updated in steps S84 through S86. At step S85, it is examined whether (STEP2), or the value stored in STEP2 is FFH (FF in hexa decimal) or not. If it is determined that (STEP2)=FFH, then step S86 is skipped. It is because that if (STEP2) is increased at step S86 when (STEP2) is FFH, (STEP2) will be 00H (00 in hexa decimal) since STEP2 is a two-bit memory in this case. In other words, FFH is an upper limit of (STEP2). Next, it is examined whether (STEP1) is greater than or equal to (STEP2). If it is determined YES at step S87, it is further examined whether (STEP2) is greater than TBSIZE/2 or not (TBSIZE is a fixed value). If NO in step S87, the procedure goes to step S89. In step S89, DATANO is set to be (STEP2)-1, which is referred to the case of acceleration performance. And PULSTB-(DATANO), or the pulse time data corresponding to the DATANO is transmitted into an accumulator, not shown, in step S90. On the other hand, if it is determined YES in step S88, the procedure goes to step S92. It is the constant performance case. And, the pulse time data is transmitted into the accumulater, in step S93. If it is determined NO in step S87, it is further examined whether (STEP1) is greater than or equal to TBSIZE/2. If it is determined YES, then the procedure goes to step S92 (the constant performance condition). If NO, the procedure goes into the deceleration performance, where a flag DOWN is set in step S94. Then, DATANO is set at step S95, and a pulse time is transmitted into the accumulater at step S96. After the pulse time having been set at step S90, S93 or S96, the set value in the accumulator is transmitted to a time register, not shown, in step S97. Pulse time interval is managed in response to the value stored in the time register. Then the interruption routine is passed through, and the procedure returns to the point in FIG. 1 where a main control procedure has been interrupted. Note that, in FIG. 1, in steps S69 and S61 through S63, the interruption procedure is permitted to execute after the period of time set in the time register at step S97 of FIG. 2, while in steps S64 through S71, the interruption procedure is inhibited. If it is determined YES in step S70, where the flag DOWN is ON and the step motor is in the deceleration performance, the interruption procedure is permitted in step S72. Note that, when in the decelerated condition, the procedure looped in steps S64, S65, S70 and S72 until (STEP1) becomes zero. It means that a performance requiring additional steps cannot be accepted when the step motor is driven in the decelerated condition.

When the motor is required to perform continuously, if the motor is in the decelerated condition (NO, in step S70), the number of steps is added to the (STEP1) and stored in STEP1 in step S71, and the motor is remained performing continuously.

The numbers of the pulse time data stored in the pulse table, which is TBSIZE, is 2n, which are numbered 0 through 2n−1 (DATANO=0 through 2n−1), respectively. The (n−1)−th data is a data for constant speed data, that is, $$n-1=TBSIZE/2$$

and this number n−1 is called a boundary number, and n−th through (2n−1)−th data are deceleration data.

For example, it is assumed that TBSIZE=10, and thirteen steps of a single performance is required (see TABLE 2). TABLE 1 is utilized as a pulse table for this case.

TABLE 2

| (STEP 1) | 12 | 11 | 10 | 9 | 8 | 7 | 6 | 5 | 4 | 3 | 2 | 1 | 0 |
|---|---|---|---|---|---|---|---|---|---|---|---|---|---|
| (STEP 2) | 1 | 2 | 3 | 4 | 5 | 6 | 7 | 8 | 9 | 10 | 11 | 12 | 13 |
| TBSIZE/2 | 5 | 5 | 5 | 5 | 5 | 5 | 5 | 5 | 5 | 5 | 5 | 5 | 5 |
| DATANO | 0 | 1 | 2 | 3 | 4 | 4 | 4 | 4 | 5 | 6 | 7 | 8 | 9 |
| CONDITION | ACCELERATED | | | | CONSTANT | | | | DECELERATED | | | | |

In first four steps, i.e., (STEP1) counts 12 down to 9, (STEP1) is greater than (STEP2) and (STEP2) is greater than TBSIZE/2, therefore DATANO=(-STEP2)−1.

In next step where (STEP1)=8, (STEP1) is greater than (STEP2) and (STEP2)=TBSIZE/2, therefore DATANO=TBSIZE/2−1.

In next step where (STEP1)=7, (STEP1) is greater than (STEP2) and (STEP2) is greater than TBSIZE/2, therefore DATANO=TBSIZE/2−1.

In next two steps, i.e., (STEP1) counts 6 down to 5, (STEP1) is less than (STEP2) and (STEP1) is greater than TBSIZE/2, therefore DATANO=TBSIZE−1.

In last five steps, i.e., (STEP1) counts 4 down to zero, (STEP1) is less than (STEP2) and (STEP1) is less than TBSIZE/2, therefore DATANO=TBSIZE−(-STEP1)−1. Boldfaced numerals represent values utilized for figuring the DATANO.

Thus, the performance of the step motor according to the pulse table (TABLE 1) is as follows:
five steps of accelerated performance;
three steps of constant performance; and
five steps of decelerated performance.

TABLE 3 shows another example of six steps of a single performance of the step motor. In this case, first three steps is performed in accelerated condition (abbreviated as ACCEL. in TABLE 3) and last three steps, in decelerated condition (abbreviated as DECEL. in TABLE 3).

TABLE 3

| (STEP 1) | 5 | 4 | 3 | 2 | 1 | 0 |
|---|---|---|---|---|---|---|
| (STEP 2) | 1 | 2 | 3 | 4 | 5 | 6 |
| TBSIZE/2 | 5 | 5 | 5 | 5 | 5 | 5 |
| DATANO | 0 | 1 | 2 | 7 | 8 | 9 |
| CONDITION | ACCEL. | | | DECEL. | | |

This six steps of a single performance including:
three steps of acceleration performance; and
three steps of deceleration performance,
without constant performance.

In the conventional motor control device, when the requirement for a continuous performance is generated during accelerated condition, the motor can perform continuously, but the requirement of an additional performance cannot be accepted during decelerated condition, therefore the motor is once stopped and then required steps of another performance is to be executed.

For example, assume the case that TBSIZE=10 and the requirement for performances are six steps and three steps and three steps and . . . (it is assumed that the requirement of each performance are to be generated by every three pulses). Note that, TABLE 1 is used as a pulse table also in this case.

TABLE 4

| ADDITIONAL STEPS | — | — | — | 3 | — | — | # | — | — |
|---|---|---|---|---|---|---|---|---|---|
| (STEP 1) | 5 | 4 | 3 | 5 | 4 | 3 | 2 | 1 | 0 |
| (STEP 2) | 1 | 2 | 3 | 4 | 5 | 6 | 7 | 8 | 9 |
| TBSIZE/2 | 5 | 5 | 5 | 5 | 5 | 5 | 5 | 5 | 5 |
| DATANO | 0 | 1 | 2 | 3 | 5 | 6 | 7 | 8 | 9 |

TABLE 4-continued

| CONDITION | ACCELERATED | DECELERATED |
|---|---|---|

In this case, at the fourth step, where the performance is in accelerated condition, the requirement for additional three steps of performance is generated, the motor can perform continuously. As newly required steps are as small as three steps, the accelerated condition is finished at fourth step and the condition is changed to decelerated one at the fifth step. As aforementioned, PULSTB(0) through PULSTB(3) correspond to the accelerated condition and PULSTB(5) through PULSTB(9) correspond to the decelerated condition. Next, the three steps of the following performance is required at the seventh step. Since the step motor performs in decelerated condition, the continuous performance cannot be executed. The requirement for the additional performance is not accepted until the continuous performance is finished.

To overcome the discontinuity in the performance of the step motor when the required steps for continuous performance is relatively small, for example, it may be suggested to lessen the value of constant data TBSIZE/2. When TBSIZE is set six in above described case, performance transfers in constant condition after two steps of accelerated condition, and requirements at third and sixth steps can be accepted because the performance is in constant condition.

If the boundary value, or TBSIZE/2 is set small as above, however, the performing speed of the motor in the constant condition becomes relatively small.

Another way to overcome above deficiencies is to utilize a step motor capable of changing its performance condition from decelerated one to accelerated one. However, such a motor is expensive, further, requires a complicated control system.

SUMMARY OF THE INVENTION

It is therefore an object of the invention to provide an improved motor control device for controlling time interval of pulse to be applied to the step motor, while enabling the step motor to perform continuously even though small number of performance steps is required with keeping the performing speed of the step motor as fast as possible.

To overcome the above deficiencies, according to the invention, there is provided a step motor control device for controlling a step motor to perform in acceleration, constant and deceleration conditions by outputting pulses having one of a plurality of phases, the device comprising input means for inputting a number of steps for the performance of the step motor, memory means having stored therein a plurality of interval data, the pulses being outputted at interval corresponding to one of the plurality of interval data, the step motor control device comprises:
determining means for determining in what condition of the acceleration, constant and deceleration conditions the pulse motor performs, based upon the number of steps inputted through the input means; and selecting means for selecting one of the interval data in accordance with the condition determined by the determining means, whereby said pulses are outputted at the interval in accordance with the interval data selected by said selecting means.

DESCRIPTION OF THE EMBODIMENTS

Figure 3:
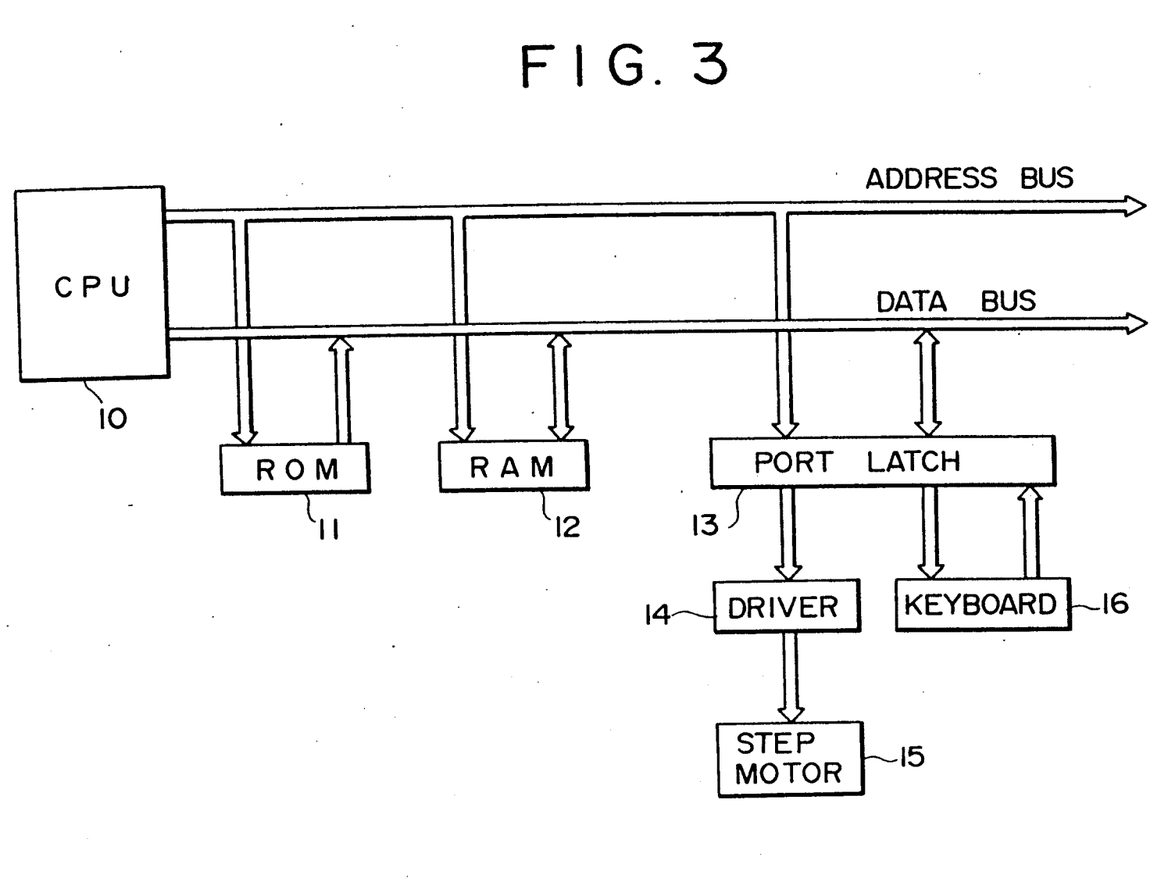
FIG. 3 is a block diagram of the control system of a motor control device embodying the present invention.

FIG. 3 is a block diagram of the control system of a step motor control device embodying the present invention.

This embodiment relates to a word processor having step motors such as a carriage drive motor, a sheet feed motor etc.

A CPU (Central Processing Unit) 10 is controlled with a program stored in a ROM (Read Only Memory) 11. Input data through a keyboard 16 is transmitted to the CPU 10 through a port latch 13. When the inputted data is data requiring motor performance, the CPU 10 starts a motor actuate program stored in the ROM 11, transmits motor actuating pulse to the port latch 13, and thereby a step motor 15 is actuated by way of a motor driver 14.

Figure 4:
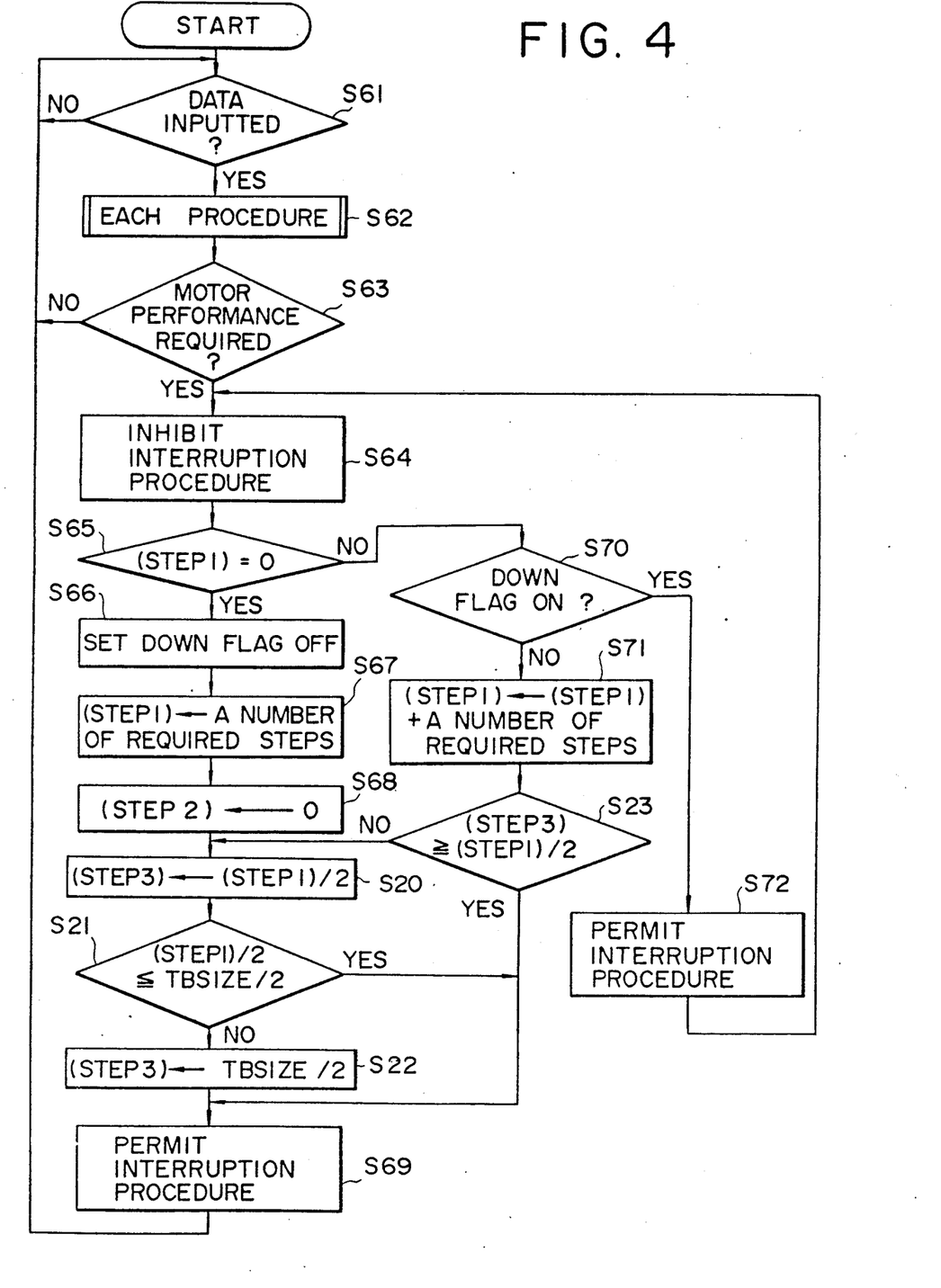
FIG. 4 is a flowchart illustrating a main control routine of the step motor control device of the present invention.
Figure 5:
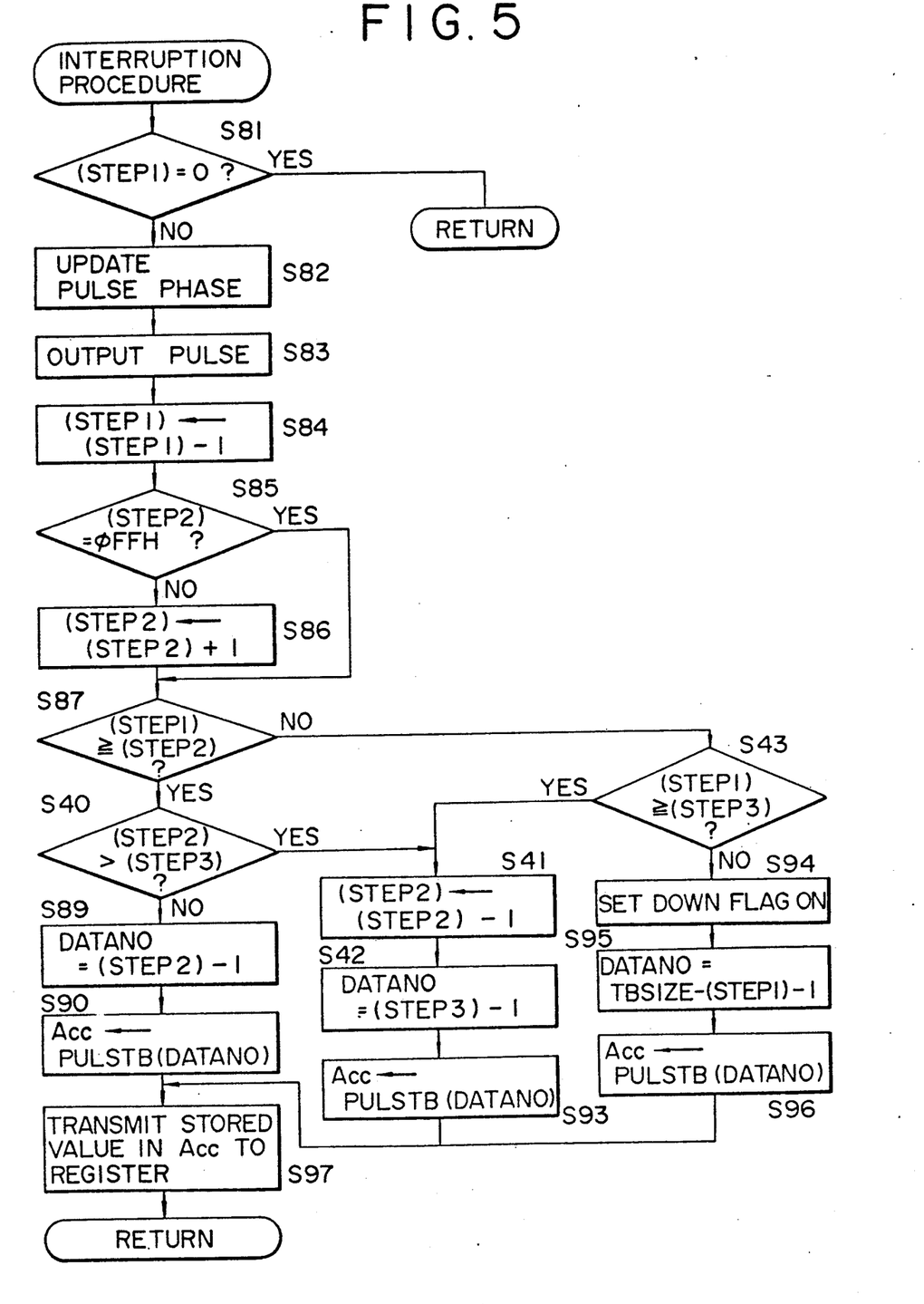
FIG. 5 is a flowchart illustrating an interruption procedure of the present invention.

FIG. 4 and FIG. 5 illustrates the control performance of the motor control device. The same steps as in FIGS. 1 and 2 are provided the same numerals of steps and further explanation will be omitted.

In this embodiment, STEP2 counts the steps from beginning of the performance of the step motor but not during constant condition.

STEP3 is a work memory for storing a data number of constant condition. The stored data in STEP3 is described as (STEP3). In steps S20 through S22, when parameters are set, the smaller between (STEP1)/2 and TBSIZE/2 is stored in STEP3.

When parameters for continuous performance is set, and (STEP3) is less than (STEP1)/2 (NO, in step S23), STEP3 is reset in steps S20 through S22.

Consequently, even the number of required steps is relatively small, the following equation is established and continuous performance is available.

(STEP3)=(STEP1)/2≦TBSIZE/2

When (STEP1) increases according to the requirement of the continuous performance, STEP3 is updated corresponding to the increase of (STEP1). Note that (STEP3) is less than or equal to TBSIZE/2.

In the interruption procedure illustrated in FIG. 5, the flowchart branches with respect of (STEP3) in steps S40 and S43 instead of TBSIZE/2.

When the step motor 15 performs in the constant condition, the procedure goes to step S41. In step S41, (STEP2) is subtracted by one in order not to increase, since (STEP2) has been added by one in step S86. In step S41, DATANO is set corresponding to the store value of STEP3.

For example, assume that TBSIZE=10, and required steps for continuous performance are six, and three, . . . (in this case the requirements are generated at every three steps). Accordingly, (STEP3)=(STEP1)/2=3<TBSIZE/2=5 therefore,
STEP3=3.

TABLE 5 shows this case.

That is, the step motor 15 is performed in accelerated condition in first three steps, and in constant condition at the fourth step.

When TBSIZE=10 and the performance steps are six, three, six, three, six, . . . , that is, the performance requirements for the relatively small numbers of steps and relatively large number of (more than or equal to TBSIZE/2) steps are mixed, (STEP3) is increased every time when additional 6 performance steps is added to (STEP1), and the performance is accelerated to the extent.

TABLE 5

| ADDITIONAL STEPS | — | — | — | 3 | — | — | 3 | — | — | 3 | — | — |
|---|---|---|---|---|---|---|---|---|---|---|---|---|
| (STEP 1) | 5 | 4 | 3 | 5 | 4 | 3 | 5 | 4 | 3 | 5 | 4 | 3 |
| (STEP 2) | 1 | 2 | 3 | 3 | 3 | 3 | 3 | 3 | 3 | 3 | 3 | 3 |
| (STEP 3) | 3 | 3 | 3 | 3 | 3 | 3 | 3 | 3 | 3 | 3 | 3 | 3 |
| DATANO | 0 | 1 | 2 | 2 | 2 | 2 | 2 | 2 | 2 | 2 | 2 | 2 |
| CONDITION | ACCEL. | | | CONSTANT | | | | | | | | |

TABLE 6

| ADDITIONAL STEPS | — | — | — | #1 | — | — | #2 | — | — | #3 | — | — | •#4 | — | — |
|---|---|---|---|---|---|---|---|---|---|---|---|---|---|---|---|
| (STEP 1) | 5 | 4 | 3 | 5 | 4 | 3 | 8 | 7 | 6 | 8 | 7 | 6 | 11 | 10 | 9 |
| (STEP 2) | 1 | 2 | 3 | 3 | 3 | 3 | 4 | 4 | 4 | 4 | 4 | 4 | 5 | 6 | 6 |
| (STEP 3) | 3 | 3 | 3 | 3 | 3 | 3 | 4 | 4 | 4 | 4 | 4 | 4 | 6 | 6 | 6 |
| DATANO | 0 | 1 | 2 | 2 | 2 | 2 | 3 | 3 | 3 | 3 | 3 | 3 | 4 | 5 | 5 |
| CONDITION | ACCEL. | | | CONSTANT A. | | | | | | CONSTANT | | | ACCEL C. | | |

TABLE 6 illustrates this example. According to TABLE 6,

1: three additional steps is required here and according to step S71 of FIG. 2, (STEP1)=3+3=6. And, (STEP3)=(STEP1)/2=3, therefore, (STEP3) is not updated;

2: (STEP1)=3+6=9, according to step S71, and (STEP1)/2>(STEP3)=2 in step S23, therefore (STEP3) is updated and (STEP3)=(STEP1)/2=4 in step S20 of FIG. 2;

3: (STEP1) is not updated; and

4: (STEP3)=(STEP1)/2=6 in step S20 of FIG. 2.

Consequently, the speed of the step motor in the constant condition becomes relatively high in this embodiment.

TABLE 7

| ADDITIONAL STEPS | — | — | — | 3 | — | — | # | — | — | 3 | — | — |
|---|---|---|---|---|---|---|---|---|---|---|---|---|
| (STEP 1) | 5 | 4 | 3 | 5 | 4 | 3 | 2 | 1 | 0 | 2 | 1 | 0 |
| (STEP 2) | 1 | 2 | 3 | 4 | 5 | 6 | 7 | 8 | 9 | 1 | 2 | 3 |
| TBSIZE/2 | 5 | 5 | 5 | 5 | 5 | 5 | 5 | 5 | 5 | 5 | 5 | 5 |
| DATANO | 0 | 1 | 2 | 3 | 5 | 6 | 7 | 8 | 9 | 0 | 8 | 9 |
| CONDITION | ACCELERATED | | | DECELERATED | | | | | | ACC | DECEL. | |
| PULSE TIME (msec.) | 4.0 | 3.9 | 3.4 | 3.1 | 3.1 | 3.4 | 3.9 | 4.0 | 30.0 | 4.0 | 4.0 | 30.0 |

TABLE 8

| ADDITIONAL STEPS | — | — | — | 3 | — | — | 3 | — | — | — | — | — |
|---|---|---|---|---|---|---|---|---|---|---|---|---|
| (STEP 1) | 5 | 4 | 3 | 5 | 4 | 3 | 5 | 4 | 3 | 2 | 1 | 0 |
| (STEP 2) | 1 | 2 | 3 | 3 | 3 | 3 | 3 | 3 | 3 | 4 | 5 | 6 |
| (STEP 3) | 3 | 3 | 3 | 3 | 3 | 3 | 3 | 3 | 3 | 3 | 3 | 3 |
| DATANO | 0 | 1 | 2 | 2 | 2 | 2 | 2 | 2 | 2 | 7 | 8 | 9 |
| CONDITION | ACCELERATED | | | CONSTANT | | | | | | DECELERATED | | |
| PULSE TIME (msec.) | 4.0 | 3.9 | 3.4 | 3.4 | 3.4 | 3.4 | 3.4 | 3.4 | 3.4 | 3.9 | 4.0 | 30.0 |

TABLE 7 and TABLE 8 show the pulse time of the conventional motor control device and that of the embodiment, respectively, when continuous performances of six, three and three steps are required.

At the marked portion (#) of FIG. 7, since the performance is in deceleration condition, the requirement of additional three steps is rejected until the step motor stops. After that, the step motor is pre-excited again and remaining three steps is performed. Pulse times corresponding to DATANOs are picked up from the pulse table, TABLE 1, respectively. In this case, sum of the pulse time is 96.8 (msec.). Practically, when the motor is actuated at stopped condition, a pre-exciting procedure is necessary. Time for the pre-exciting procedure is 5.0 (msec.) in this embodiment.

Therefore, before the first and tenth step, the pre-exciting procedure is executed and it will take 106.8 (msec.) from beginning of the continuous performance to the end of it.

On the other hand, when the same continuous performance is executed by the motor control device of this embodiment, it will take 74.6 (msec.) from beginning to the end of the performance including the pre-exciting procedure.

As explained above, when relatively small number of steps are continuously required, the device is capable of performing continuously without unnecessarily stopping during the performance. Further, the total performing time from the beginning to the end of the continuous performance can be shortened with this embodiment. On the other hand, when relatively large number of steps are required (more than or equal to TBSIZE), TBSIZE/2 is stored in STEP3. Therefore, the total performing time is equal to that of conventional ones, in this case.

It should be noted that the present invention is not limited to the embodiment described above but can be modified within the spirit and scope of the invention.

What is claimed is:

1. A step motor control device for receiving a number of steps, and for driving a step motor which is capable of performing in accelerated, constant, and decelerated conditions in accordance with the inputted number of steps, said device comprising:

setting means for setting an upper-limit speed of said motor when the number of steps to be performed by said motor is inputted, said upper-limit speed being increased under a first predetermined condition when a number of additional steps to be performed by said motor is inputted after said motor started moving; and control means for driving said motor in such a fashion that said motor is driven in accelerated condition if the speed of said motor is lower than said upper-limit speed, that said motor is driven in decelerated condition if the number of the remaining steps to be performed by said motor is less than or equal to the number of steps necessary to stop said motor when being driven at said upper-limit speed, otherwise, that said motor is driven in the constant condition at said upper-limit speed.

2. The step motor control device according to claim 1, further comprising determining means for determining the number of steps necessary to stop said motor when being driven in the constant condition at said upper-limit speed.

3. The step motor control device according to claim 2, wherein said setting means increases said upper-limit speed if the number of steps determined by said determining means is greater than the number of steps necessary to decelerate to stop said motor when said motor is driven in the constant condition at said upper-limit speed.

4. The step motor control device according to claim 3, wherein said setting means increases said upper-limit speed so that the number of steps necessary to stop said motor when being driven at the upper-limit speed increased by said setting means is equal to the number of steps determined by said determining means.

5. The step motor control device according to claim 2, wherein said determining means determines said number of steps in such a fashion that said number of steps necessary to stop said motor when being driven at said upper-limit speed is a half of the number of remaining steps to be performed by said motor.

6. The step motor control device according to claim 1, wherein the input of the number of additional steps to be performed by said motor is ignored when said motor is driven to perform in said decelerated condition.

7. The step motor control device according to claim 1, wherein said upper-limit speed is limited to a predetermined value.

8. The step motor control device according to claim 7, further comprising data storing means for storing data which is referred to when the motor is driven, and wherein said predetermined value is determined from said data stored in said data storing means.

9. The step motor control device of claim 1 wherein said motor has a maximum speed, wherein said setting means sets said upper-limit speed at a level smaller than said maximum speed, and wherein said upper-limit speed is maintained constant under a second preset condition when the number of additional steps is inputted.

* * * * *